No. 834,896. PATENTED NOV. 6, 1906.
G. FINK & C. J. CARLSON.
CARRIER.
APPLICATION FILED MAR. 28, 1906.
2 SHEETS—SHEET 1.
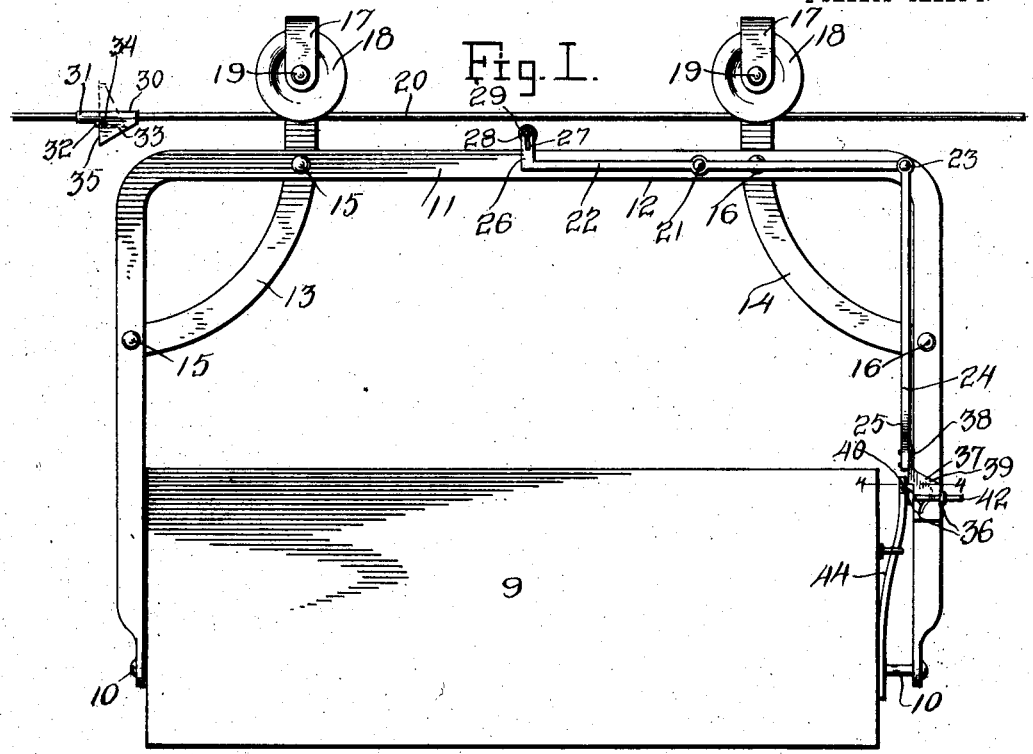
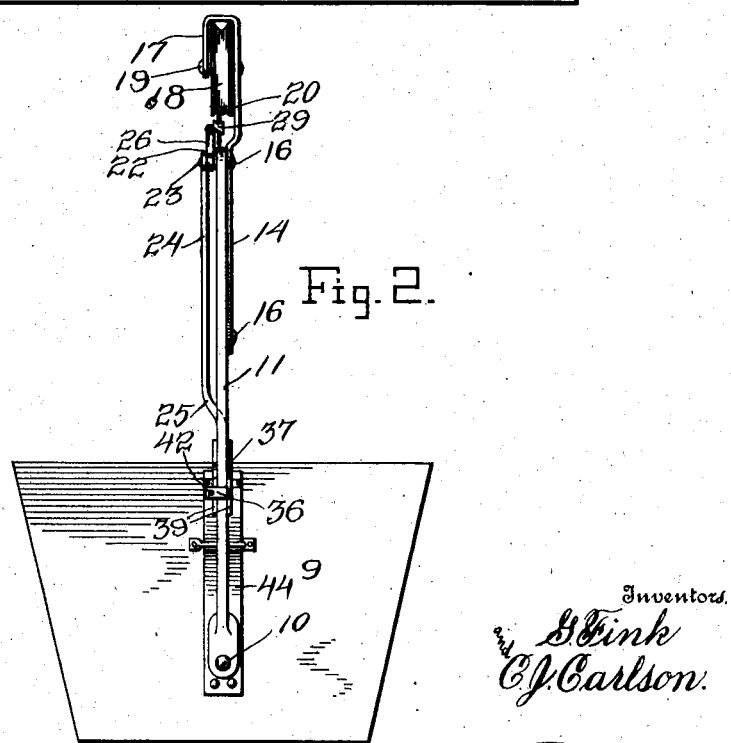
Witnesses
C. K. Reichenbach
J. C. Jones
Inventors
G. Fink
C. J. Carlson
By Chandler & Chandler Attorneys

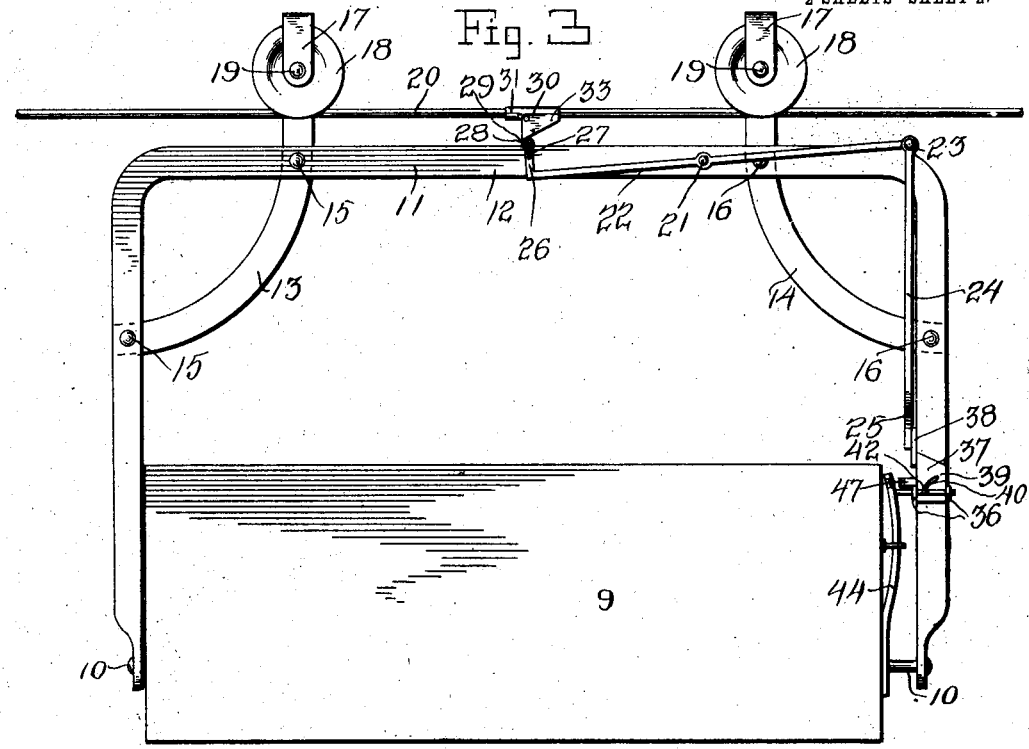

UNITED STATES PATENT OFFICE.

GEORGE FINK AND CHARLES J. CARLSON, OF NORTHFIELD, MINNESOTA.

CARRIER.

No. 834,896.      Specification of Letters Patent.      Patented Nov. 6, 1906.

Application filed March 28, 1906. Serial No. 308,526.

*To all whom it may concern:*

Be it known that we, GEORGE FINK and CHARLES J. CARLSON, citizens of the United States, residing at Northfield, in the county of Rice, State of Minnesota, have invented certain new and useful Improvements in Carriers; and we do hereby declare the following to be a full, clear, and exact description of the invention, such as will enable others skilled in the art to which it appertains to make and use the same.

This invention relates to an improved carrying device particularly adapted for removing refuse and the like from large stables or barns and carrying and dumping the same to some predetermined point exterior of said stable or barn.

The object of the invention is to provide an improved carrier which when filled and started is automatically adapted to carry its contents from the barn or stable, dump the same at the predetermined point, and return for a second trip.

Particular improvements consist in the provision of a carrying-receptacle with automatic means whereby the same is locked in place upon a carrying-frame, is unlocked and permitted to revolve upon its pivot to dump its contents, and to be automatically returned and locked.

With these and such objects as will appear later on the invention consists in the details of construction and novelties of combination hereinafter fully described, and pointed out in the claims.

The invention will be more readily understood from an inspection of the appended drawings, forming a part of the specification, and in which the same parts are referred to by like numerals in all the views.

In the drawings, Figure 1 is a side elevation of the improved carrier. Fig. 2 is an end view of the same. Fig. 3 is a side elevation showing the receptacle released. Fig. 4 is a transverse section on the line 4 4 of Fig. 1. Fig. 5 is a detail view.

Referring to the drawings, 9 designates the receptacle, which is pivoted, as at 10, to the carrier-frame 11 in such a manner that the receptacle is adapted to revolve or swing upon its pivot when released from its upright position. The upper portion of the carrier-frame is designated by 12. 13 and 14 refer, respectively, to two arms which are fastened to the upper portions of the carrier-frame by bolts 15 and 16, respectively, and which extend above the top of the upper portion of the frame, as shown in Fig. 1. The upper ends of the arms 13 and 14 are bent upon themselves, as at 17, to form hooked bearing portions for the pulleys 18, which are fastened in place thereon by means of bolts 19.

The pulleys are provided with a groove in which the wire cable 20 fits, and the entire carrier is adapted by means thereof for travel upon said cable.

Pivoted to the upper portion of the carrier-frame, as at 21, is a horizontally-arranged lever 22, to the outer end of which is attached, by means of a bolt 23, the locking-bar 24, provided with an outwardly-bent portion 25. The free end of lever 22 is bent upwardly, as at 26, said bent portion being provided with a slot 27, through which passes a headed pin 28, carrying a roller 29. By threading the opposite end of pin 28 and providing the same with a nut (not shown) the position of said pin and roller in the slot can be adjusted.

Above the point at which the contents of the receptacle are to be dumped there is attached to the under side of the cable a trip, (generally designated 30.) This trip consists of a body 31, embracing the cable and having on its under side a depending shoulder 32, to which the tooth 33 of the trip is attached by means of a pin 34. The formation of the trip is such that when the carrier is on its return passage the roller 29 will strike the vertical side 35 of the tooth and move the latter upwardly to the position shown in dotted lines in Fig. 1, allowing the carrier to pass freely thereunder. When, however, the carrier is on its outward passage, any movement of the tooth will be prevented by the contact of the shoulder 32 and side of the tooth 35, which will retain said tooth in its horizontal position and cause roller 29 to move along the inclined surface of said tooth with a tilting effect upon said lever.

As will be seen from an inspection of Figs. 1 and 3, the lower portion of the frame 11 adjacent the locking-bar 24 is provided with a pair of outward extensions 36 at the edges thereof and at right angles to the body portion, while the lower end of bar 24 has connected thereto a box 37. (Shown in detail in Fig. 5.) Said box consists, as shown, of a body portion 38, bolted to the end of said bar, and a pair of sides 39 at right angles to the body 38 and embracing the frame 11, forming guides for the movement of said bar along the frame. Each side 39 is provided with a curved slot 40, the two slots being in alinement.

The frame 11 is correspondingly slotted to permit the passage therethrough of a pin 41, projecting from midway between the ends of a rod 42, the ends of which pass through perforations 43 in the extensions 36.

The end of the receptacle adjacent the locking-bar is provided with a flat spring 44, attached to said end adjacent the lower edge thereof, as will be seen from Figs. 1 and 2. The upper end of the spring is provided with a perforation 46. A pin 47 is positioned on the inner surface of the frame 11 opposite said perforation, and the receptacle is normally locked in place upon the frame by the passage of said pin 47 through perforation 46. The spring is removed from its locking position upon the pin by means of the sliding rod 42.

The operation of the carrier may be briefly described as follows: The receptacle 9 is filled within the barn, it being understood that said receptacle is in its locked position upon the frame, and the carrier is swung forwardly upon the cable, upon which it travels by means of its grooved rollers 18. The receptacle is adapted to be revolved within the frame and its contents dumped by the coöperation of the roller and cable trip, the latter being placed, as stated, above the point at which the removal of the contents of the receptacle is to be effected. When the roller-trip contacts with the tooth of the cable-trip, the former will swing upon its axis, as shown in Fig. 3, owing to the fact that the tooth 33 can move only in the direction opposite to that of the travel of the carrier on its out passage. The outer end of the lever 21 will accordingly be lowered, and the upper end thereof will therefore be raised, as shown in Fig. 3, carrying up therewith the locking-bar 24. By the action of the curved slots 40 in said bar the pin 41, working in said slot, will be given a slight lateral movement, and the inner end of the rod 42, carrying said pin, will be moved into contact with the upper end of the spring 44, forcing the same against the side of the receptacle 9 and releasing the pin 47 from its seat in said spring. The receptacle will then of its own weight perform a complete revolution, dumping its contents, and at the completion of its revolution as the spring 44 is free to again move outwardly into contact with the pin 47, which is received within the perforation in the spring, the receptacle is again locked in place. The portion of the cable beyond the cable-trip is extended upwardly, and the carrier after passing the cable-trip travels upon said extension by the force of its original movement. On its return passage the roller 29 on contacting with the cable-trip raises the tooth thereof, and the carrier passes beneath said trip in its locked position, the cable-tooth being movable when the carrier moves in this direction, as shown in Fig. 1.

It is thought unnecessary to illustrate the upward extension of the cable beyond the cable-trip, as the same may be effected in any desired manner, it being understood that the carrier after passing the cable-trip on its outward passage still continues to travel some distance upon said extension and then returns by reason of its own weight to its starting-point.

It will be seen from Figs. 1 and 2 that the pivot 10 for the receptacle within its frame is located approximately close to the lower edge of said receptacle and, further, that the receptacle is a trifle top-heavy owing to its shape. It will be thus apparent that when the spring on the receptacle is released from contact with the locking-pin said receptacle will at once revolve on its pivot of its own weight, which would be sufficient to permit of a complete revolution and subsequent relocking.

It is apparent that the bent end and roller of the horizontal lever form a trip which coöperates with the cable-trip, and the term used in the claims, "a trip on said frame," has reference to this construction.

Obviously modifications and changes may be made in the invention within the scope of the claims and without departing from the spirit of the invention, and it is not, therefore, intended that the invention be limited to the exact construction shown and described.

What is claimed is—

1. A carrier comprising in combination a frame, and a receptacle journaled in said frame and adapted for a revolving movement therein, a cable upon which said carrier travels, a spring on one end of said carrier, having a perforation in its upper portion, a pin on said frame adapted to enter said perforation to lock said carrier in place, a bar for releasing said spring from contact with said pin, and coöperating devices upon said cable and frame for automatically operating said bar.

2. A carrier comprising in combination a frame, and a receptacle journaled in said frame and adapted for a revolving movement therein, a spring fastened to one end of said receptacle and provided with a perforation, a pin upon said frame adjacent said spring and adapted to enter said perforation to lock said receptacle in place, a bar for releasing said spring from contact with said pin to permit the revolution of said receptacle, a cable upon which said carrier is adapted to travel, a trip on said cable, and a trip on said frame adapted to coöperate with said cable-trip to operate said bar.

3. A carrier comprising in combination a frame, a receptacle journaled in said frame and adapted for a revolving movement therein, a cable upon which said carrier is adapted to travel, a spring secured to one end of said receptacle and provided with a perforation, a pin upon said frame adapted to enter said perforation to lock said receptacle in place, means for releasing said spring from engagement with said pin to permit the revolution of said receptacle, and means for automatically operating said releasing means.

4. A carrier comprising in combination a frame, and a receptacle journaled in said frame and adapted for a revolving movement therein, a cable upon which said carrier is adapted to travel, spring-locking means for retaining said receptacle in place in said frame, a lever journaled in the upper portion of said frame, a bar connected to said lever, a slot in the lower end of said bar, a laterally-moving rod in said frame adjacent said slot, and a pin on said rod adapted to enter said slot, said rod being adapted to contact at one of its ends with said spring-locking means to release the same, and automatic means for effecting the movement of said lever.

5. A carrier comprising in combination a frame, and a receptacle journaled in said frame and adapted for a revolving movement therein, a cable upon which said carrier is adapted to travel, a spring attached to one end of said receptacle and formed with a perforation, and a pin on said frame adjacent said perforation and normally adapted to enter the same, extensions formed on said frame adjacent said spring, alining perforations in said extensions, and a laterally-movable rod passing through said perforations, a vertically-movable bar adjacent said frame and having means for causing the lateral movement of said rod, and automatic means for operating said bar.

6. A carrier comprising in combination a frame, and a receptacle journaled in said frame and adapted for a revolving movement therein, a pin on said frame, and a spring on one end of said receptacle and provided with a perforation adapted to receive said pin, a rod laterally movable in said frame and adapted to contact at one end thereof with said spring, a vertically-movable bar attached to said frame, means on one end of said bar for connecting the same with said rod, and automatically-movable means for operating said bar to laterally move said rod and release said spring from said pin.

7. A carrier comprising in combination a receptacle, and a frame in which the receptacle is adapted to revolve, a cable on which said carrier travels, a spring attached to one end of said receptacle adjacent the frame, having a perforation in its upper end, and a pin on said frame adapted to enter said perforation, a rod laterally movable in said frame and contacting at one of its ends with said spring, a pin on said rod intermediate its ends, a vertically-movable bar attached to said frame, and provided with curved slots at its lower end adapted to receive the pin on said rod, and automatic means for operating said bar to laterally move said rod and release said spring from its locked position upon said frame-pin to permit the revolution of said receptacle in said frame.

In testimony whereof we affix our signatures in presence of two witnesses.

GEORGE FINK
CHARLES J. CARLSON.

Witnesses:
ARTHUR B. CHILDRESS,
CHARLES H. BLOOD.